(12) United States Patent
Yin et al.

(10) Patent No.: US 11,356,416 B2
(45) Date of Patent: Jun. 7, 2022

(54) SERVICE FLOW CONTROL METHOD AND APPARATUS

(71) Applicant: HUAWEI TECHNOLOGIES CO., LTD., Guangdong (CN)

(72) Inventors: Yu Yin, Shanghai (CN); Caixia Qi, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 218 days.

(21) Appl. No.: 16/563,332

(22) Filed: Sep. 6, 2019

(65) Prior Publication Data

US 2019/0394169 A1    Dec. 26, 2019

Related U.S. Application Data

(63) Continuation of application No. PCT/CN2018/077008, filed on Feb. 23, 2018.

(30) Foreign Application Priority Data

Mar. 9, 2017    (CN) .......................... 201710138725.0

(51) Int. Cl.
*G06F 21/00*    (2013.01)
*H04L 9/40*    (2022.01)

(52) U.S. Cl.
CPC ...... *H04L 63/0254* (2013.01); *H04L 63/0236* (2013.01); *H04L 63/0263* (2013.01); *H04L 63/145* (2013.01)

(58) Field of Classification Search
CPC ............... H04L 63/145; H04L 63/0263; H04L 63/0236; H04L 63/0254; H04L 63/00; H04L 63/02; H04L 63/10; G06F 21/60; G06F 21/50; G06F 21/00
USPC ........................................................ 726/11
See application file for complete search history.

(56) References Cited

U.S. PATENT DOCUMENTS

| | | | |
|---|---|---|---|
| 8,248,942 B2 | 8/2012 | Wing et al. | |
| 2006/0206608 A1 | 9/2006 | Naito et al. | |
| 2007/0118894 A1* | 5/2007 | Bhatia | H04L 63/168 726/13 |
| 2013/0198830 A1* | 8/2013 | Nemoto | H04L 45/14 726/12 |
| 2013/0336330 A1* | 12/2013 | Hedman | H04L 45/74 370/401 |
| 2014/0033271 A1* | 1/2014 | Barton | H04L 51/08 726/1 |
| 2014/0233385 A1 | 8/2014 | Beliveau et al. | |

(Continued)

FOREIGN PATENT DOCUMENTS

| | | |
|---|---|---|
| CN | 1581803 A | 2/2005 |
| CN | 101355415 A | 1/2009 |

(Continued)

*Primary Examiner* — Josnel Jeudy
(74) *Attorney, Agent, or Firm* — Womble Bond Dickinson (US) LLP

(57) ABSTRACT

This application discloses a service flow control method and apparatus, to resolve an existing problem of relatively low security. The method includes: generating, by a terminal device, a service flow policy; and sending, by the terminal device, the service flow policy to a routing device, where the service flow policy is used to instruct the routing device to perform data packet filtering on a downlink data packet according to the service flow policy.

11 Claims, 10 Drawing Sheets

(56) References Cited

U.S. PATENT DOCUMENTS

| | | | | |
|---|---|---|---|---|
| 2015/0103743 A1* | 4/2015 | Tamura | ................ | H04W 40/02 |
| | | | | 370/328 |
| 2015/0263957 A1* | 9/2015 | Wang | .................... | H04W 4/90 |
| | | | | 370/230 |
| 2016/0337962 A1* | 11/2016 | Peng | ................... | H04W 72/042 |
| 2017/0070535 A9 | 3/2017 | Liu et al. | | |
| 2020/0404538 A1* | 12/2020 | Zhu | ........................ | H04L 67/06 |
| 2021/0014722 A1* | 1/2021 | Han | ................. | H04W 28/0268 |

FOREIGN PATENT DOCUMENTS

| | | |
|---|---|---|
| CN | 102325350 A | 1/2012 |
| CN | 102821029 A | 12/2012 |
| CN | 103281333 A | 9/2013 |
| CN | 104363228 A | 2/2015 |
| CN | 104731868 A | 6/2015 |
| CN | 104965838 A | 10/2015 |
| CN | 105050140 A | 11/2015 |
| CN | 105743878 A | 7/2016 |
| CN | 105847236 A | 8/2016 |
| EP | 3041190 A1 | 7/2016 |
| WO | 2013072776 A2 | 5/2013 |

\* cited by examiner

SERVICE FLOW CONTROL METHOD AND APPARATUS

CROSS-REFERENCE TO RELATED APPLICATIONS

This application is a continuation of International Application No. PCT/CN2018/077008, filed on Feb. 23, 2018, which claims priority to Chinese Patent Application No. 201710138725.0, filed on Mar. 9, 2017. The disclosures of the aforementioned applications are hereby incorporated by reference in their entireties.

TECHNICAL FIELD

This application relates to the field of communications technologies, and in particular, to a service flow control method and apparatus.

BACKGROUND

As terminal devices are increasingly diversified (for example, a smartphone, a tablet computer, and a vehicle-mounted computer emerge) and a quantity of applications on a terminal device grows rapidly (for example, a video calling application, a virtual reality (VR) application, and a mobile shopping application emerge), a mobile communications network has dramatically changed people's life in recent years, affecting people's life, study, work, entertainment, and the like. In addition, the terminal device is subject to more network security threats. For example, some terminal devices in a network continuously receive downlink data packets from a data network, or on a Trojan infected website, a Trojan virus is hidden in a home page visited by a user.

The network security threat may cause, to a user, a risk of a property loss or privacy information leakage. For example, information such as an account and a password of the terminal device is leaked, causing a property loss. For another example, traffic of the terminal device is occupied when a large quantity of downlink data packets are sent to the terminal device, and the terminal device needs to pay excessive communication costs based on the traffic. In addition, the large quantity of downlink data packets occupy network resources, and consequently network congestion may occur.

Currently, an operator usually deploys a firewall to ensure security isolation between the mobile communications network and the external data network, to prevent the terminal device from being subject to an external security threat. The firewall determines, according to a locally configured filtering rule, for example, data packet header information such as a 5-tuple (a source IP address, a destination IP address, a protocol type, a source port, and a destination port) of a data packet, and information such as a data packet transmission direction, whether to allow the data packet to enter the mobile communications network from the external data network through the firewall, and sends the data packet to the terminal device.

Currently, because a network security threat method evolves rapidly, a filtering rule also needs to be updated. Therefore, in the method in which a downlink data packet is filtered by using only the locally configured filtering rule, there is a higher possibility that a vulnerability occurs on the firewall, and consequently the firewall cannot prevent the terminal device from all security threats from the external data network.

In addition, a 5G network serves more vertical industries such as an Internet of Vehicles and an Internet of Things. Users in the vertical industries may be allowed to use only a few applications. For example, an electricity meter terminal needs to communicate with only an application server of an electric power company to implement a service such as electronic meter reading. Currently, it is difficult to support differentiated and flexible control based on a vertical industry application mode by using a mechanism in which a filtering rule is locally configured on a firewall.

SUMMARY

Embodiments of this application provide a service flow control method and apparatus, to solve an existing problem of relatively low security.

According to a first aspect, an embodiment of this application provides a service flow control method, including: generating, by a terminal device, a service flow policy; and sending, by the terminal device, the service flow policy to the routing device, where the service flow policy is used to instruct the routing device to perform data packet filtering on a downlink data packet according to the service flow policy.

In one embodiment, the terminal device sends the service flow policy generated by the terminal device to the routing device, so that based on a requirement of the terminal device, the routing device blocks a data packet that poses a security threat, and allows a secure data packet to pass, to avoid causing, to the terminal device, a security risk such as a property loss or privacy information leakage.

In one embodiment, the terminal device may generate the service flow policy in the following manner:

generating, by the terminal device, the service flow policy based on service flow policy configuration information; or generating, by the terminal device, the service flow policy based on information that is entered by a user and that is about a data packet that poses a security threat; or identifying, by the terminal device, a downlink data packet that poses a security threat, and generating the service flow policy based on the identified downlink data packet; or identifying, by the terminal device, a downlink data packet that poses a security threat, and generating the service flow policy based on a downlink data packet that poses a security threat and that is confirmed by a user.

In one embodiment, the terminal device generates the service flow policy. Because of diversified terminal devices and applications on the terminal device, it is ensured that the service flow policy received by the routing device is also updated, thereby reducing a possibility that a vulnerability occurs on the routing device, and improving security of the terminal device.

In one embodiment, the identifying, by the terminal device, a downlink data packet that poses a security threat includes: receiving, by the terminal device, the downlink data packet; and if it is determined that there is no port for listening to the downlink data packet on the terminal device, identifying, by the terminal device, that the downlink data packet poses a security threat.

In the foregoing manner, when it is determined that there is no port for listening to the downlink data packet on the terminal device, the terminal device identifies that the downlink data packet poses a security threat, thereby improving accuracy of listening to a data packet that poses a security threat.

In one embodiment, the sending, by the terminal device, the service flow policy to the routing device includes:

sending, by the terminal device, the service flow policy to the routing device by using a network device; or sending, by the terminal device, the service flow policy to the routing device by using a security server.

In one embodiment, the method further includes: receiving, by the terminal device in a process in which the terminal device registers with the network device, a communication address of the security server that is sent by the network device; and the sending, by the terminal device, the service flow policy to the routing device by using a security server includes: sending, by the terminal device, the service flow policy to the security server based on the communication address of the security server.

In one embodiment, the communication address of the security server is obtained in the process in which the terminal device registers with the network device, so that the terminal device can send the service flow policy to the security server, and the security server forwards the service flow policy to the routing device. Because the security server is of high security, security of the service flow policy is improved.

In one embodiment, the service flow policy includes at least one data packet filtering rule and operation information corresponding to each data packet filtering rule.

In one embodiment, the routing device may be a gateway device, a firewall, or another device that can implement data packet filtering.

According to a second aspect, an embodiment of this application provides a service flow control method, including: obtaining, by a network device, a service flow policy; and sending, by the network device, the service flow policy to a routing device, where the service flow policy is used to instruct the routing device to perform data packet filtering on a downlink data packet according to the service flow policy.

In the foregoing manner, the service flow policy is not configured on the routing device, but instead the network device obtains the service flow policy, and sends the service flow policy to the routing device, so that the routing device obtains service flow policies sent by a plurality of network devices. Therefore, the routing device obtains more diversified service flow policies, thereby improving accuracy of filtering a data packet that poses a security threat, and improving security of the terminal device.

In one embodiment, the service flow policy includes at least one data packet filtering rule and operation information corresponding to each data packet filtering rule.

In comparison with the prior art in which one piece of operation information is used for all data packet filtering rules, in this method, data packets are processed in a more diversified manner, thereby improving accuracy of filtering a data packet that poses a security threat, and improving security of the terminal device.

In one embodiment, the obtaining, by a network device, a service flow policy includes: receiving, by the network device, the service flow policy sent by a terminal device.

The terminal device sends the service flow policy of the terminal device to the network device, so that the network device sends the service flow policy to the routing device. Therefore, the routing device controls a service flow based on a requirement of the terminal device, to avoid causing, to the terminal device, a security risk such as a property loss or privacy information leakage.

In one embodiment, the obtaining, by a network device, a service flow policy includes: obtaining, by the network device, the service flow policy from an operator application platform.

In one embodiment, before the obtaining, by a network device, a service flow policy, the method further includes: receiving, by the network device, a correspondence that is between a user attribute and a service flow policy and that is sent by the operator application platform; and obtaining, by the network device, a user attribute of a terminal device in a process in which the terminal device registers with the network device; and the obtaining, by a network device, a service flow policy includes: determining, by the network device, a service flow policy corresponding to the user attribute of the terminal device.

In one embodiment, different service flow policies are configured for different users. Therefore, differentiated and flexible control based on a vertical industry application mode is implemented while security of the terminal device is ensured.

In one embodiment, before the obtaining, by a network device, a service flow policy, the method further includes: obtaining, by the network device, a user attribute of a terminal device in a process in which the terminal device registers with the network device; and the obtaining, by a network device, a service flow policy includes: obtaining, by the network device, a service flow policy corresponding to the user attribute from the operator application platform.

In one embodiment, different service flow policies are configured for different users. Therefore, differentiated and flexible control based on a vertical industry application mode is implemented while security of the terminal device is ensured.

In one embodiment, the method further includes:

sending, by the network device, a communication address of a security server to a terminal device in a process in which the terminal device registers with the network device, so that the terminal device sends the service flow policy to the routing device by using the security server based on the communication address.

In one embodiment, the routing device is a gateway device or a firewall.

According to a third aspect, an embodiment of this application further provides a service flow control method, including: obtaining, by a routing device, a service flow policy; and when receiving a downlink data packet, performing, by the routing device, data packet filtering on the downlink data packet according to the service flow policy.

In one embodiment, the obtaining, by a routing device, a service flow policy includes: receiving, by the routing device, the service flow policy sent by a terminal device; or receiving, by the routing device, the service flow policy sent by an operator application platform.

In one embodiment, the service flow policy is not configured on the routing device, but instead the routing device receives the service flow policy sent by the terminal device or the operator application platform. Therefore, the service flow policy is updated, thereby improving security of the terminal device.

In one embodiment, the service flow policy includes at least one data packet filtering rule and an operation corresponding to each data packet filtering rule; and the performing, by the routing device, data packet filtering on the downlink data packet according to the service flow policy includes: determining, by the routing device, a data packet filtering rule that matches the downlink data packet, and performing an operation corresponding to the matched data packet filtering rule on the downlink data packet.

In one embodiment, the routing device is a gateway device or a firewall.

According to a fourth aspect, an embodiment of this application provides a service flow control method, including: receiving, by a security server, a service flow policy sent by a terminal device; and sending, by the security server, the service flow policy to a routing device, where the service flow policy is used to instruct the routing device to perform data packet filtering on a downlink data packet according to the service flow policy.

In one embodiment, the terminal device sends the service flow policy generated by the terminal device to the routing device, so that based on a requirement of the terminal device, the routing device blocks a data packet that poses a security threat, and allows a secure data packet to pass, to avoid causing, to the terminal device, a security risk such as a property loss or privacy information leakage. In addition, the terminal device sends the service flow policy to the security server, and the security server forwards the service flow policy to the routing device. Because the security server is of high security, security of the service flow policy is improved.

In one embodiment, the service flow policy is preconfigured on the terminal device; or the service flow policy is generated by the terminal device based on information that is entered by a user and that is about a data packet that poses a security threat; or the service flow policy is generated by the terminal device based on an identified downlink data packet that poses a security threat; or the service flow policy is generated by the terminal device based on an identified downlink data packet that poses a security threat and that is confirmed by a user.

In one embodiment, the routing device is a gateway device or a firewall.

According to a fifth aspect, an embodiment of this application provides a service flow control method, including: determining, by an operator application platform, a service flow policy; and sending, by the operator application platform, the service flow policy to a routing device, where the service flow policy is used to instruct the routing device to perform data packet filtering on a downlink data packet according to the service flow policy.

In one embodiment, the method further includes:

receiving, by the operator platform, a service flow policy request message sent by a network device, where the service flow policy request message carries a user attribute of a terminal device; and the determining, by an operator application platform, a service flow policy includes: determining, by the operator platform based on a preconfigured correspondence between a user attribute and a service flow policy, a service flow policy corresponding to the user attribute of the terminal device.

In one embodiment, different service flow policies are configured for different users. Therefore, differentiated and flexible control based on a vertical industry application mode is implemented while security of the terminal device is ensured.

In one embodiment, the routing device is a gateway device or a firewall.

According to a fifth aspect, an embodiment of this application provides a service flow control apparatus, including:

a processing unit, configured to generate a service flow policy; and a sending unit, configured to send the service flow policy generated by the processing unit to a routing device, where the service flow policy is used to instruct the routing device to perform data packet filtering on a downlink data packet according to the service flow policy.

In one embodiment, the processing unit is configured to:

generate the service flow policy based on service flow policy configuration information; or generate the service flow policy based on information that is entered by a user and that is about a data packet that poses a security threat; or identify a downlink data packet that poses a security threat, and generate the service flow policy based on the identified downlink data packet; or identify a downlink data packet that poses a security threat, and generate the service flow policy based on a downlink data packet that poses a security threat and that is confirmed by a user.

In one embodiment, the apparatus further includes: a receiving unit, configured to receive the downlink data packet; and when identifying the downlink data packet that poses a security threat, the processing unit is configured to: if it is determined that there is no port for listening to the downlink data packet on the terminal device, identify that the downlink data packet poses a security threat.

In one embodiment, the sending unit is configured to: send the service flow policy to the routing device by using a network device; or send the service flow policy to the routing device by using a security server.

In one embodiment, the apparatus further includes:

a receiving unit, configured to receive, in a process in which the terminal device registers with the network device, a communication address of the security server that is sent by the network device; and when sending the service flow policy to the routing device by using the security server, the sending unit is configured to: send the service flow policy to the security server based on the communication address of the security server.

In one embodiment, the service flow policy includes at least one data packet filtering rule and operation information corresponding to each data packet filtering rule.

In one embodiment, the routing device is a gateway device or a firewall.

According to a sixth aspect, an embodiment of this application provides a service flow control apparatus, including:

an obtaining unit, configured to obtain a service flow policy; and a sending unit, configured to send the service flow policy to a routing device, where the service flow policy is used to instruct the routing device to perform data packet filtering on a downlink data packet according to the service flow policy.

In one embodiment, the service flow policy includes at least one data packet filtering rule and operation information corresponding to each data packet filtering rule.

In one embodiment, the apparatus further includes:

a receiving unit, configured to receive the service flow policy sent by a terminal device.

In one embodiment, the obtaining unit is configured to:

obtain the service flow policy from an operator application platform.

In one embodiment, the receiving unit is further configured to: before the obtaining unit obtains the service flow policy, receive a correspondence that is between a user attribute and a service flow policy and that is sent by the operator application platform; and the obtaining unit is configured to: obtain a user attribute of a terminal device in a process in which the terminal device registers with the network device, and determine a service flow policy corresponding to the user attribute of the terminal device.

In one embodiment, the obtaining unit is further configured to obtain, in a process in which a terminal device registers with the network device, a user attribute of the terminal device before obtaining the service flow policy; and the obtaining unit is configured to obtain a service flow policy corresponding to the user attribute from the operator application platform when obtaining the service flow policy.

In one embodiment, the sending unit is further configured to:

send a communication address of a security server to a terminal device in a process in which the terminal device registers with the network device, so that the terminal device sends the service flow policy to the routing device by using the security server based on the communication address.

In one embodiment, the routing device is a gateway device or a firewall.

Based on a same inventive concept as the method embodiment, according to a seventh aspect, an embodiment of this application further provides a service flow control apparatus applied to a terminal device. The apparatus includes: a transceiver, a processor, and a memory.

The memory is configured to store program code executed by the processor.

The processor receives and sends data by using the transceiver, and is configured to execute the program code stored in the memory, to implement the method according to any one of the first aspect or the designs of the first aspect.

Based on a same inventive concept as the method embodiment, according to an eighth aspect, an embodiment of this application further provides a service flow control apparatus applied to a network device. The apparatus includes: a communications interface, a processor, and a memory.

The memory is configured to store program code executed by the processor.

The processor receives and sends data through the communications interface, and is configured to execute the program code stored in the memory, to implement the method according to any one of the second aspect or the designs of the second aspect.

According to a ninth aspect, an embodiment of this application further provides a computer storage medium. The storage medium stores a software program. When the software program is read and executed by one or more processors, the method according to any one of the first aspect or the designs of the first aspect, the method according to any one of the second aspect or the designs of the second aspect, the method according to any one of the third aspect or the designs of the third aspect, or the method according to any one of the fourth aspect or the designs of the fourth aspect may be implemented.

DESCRIPTION OF EMBODIMENTS

Embodiments of this application may be applied to 2G (2nd generation mobile communications system), 3G (3rd generation mobile communications system), or 4G (4th generation mobile communications system) such as a long term evolution (LTE) system, or may be applied to 5G (5th generation mobile communications system) such as a 5G system architecture (5GS).

Figure 1:
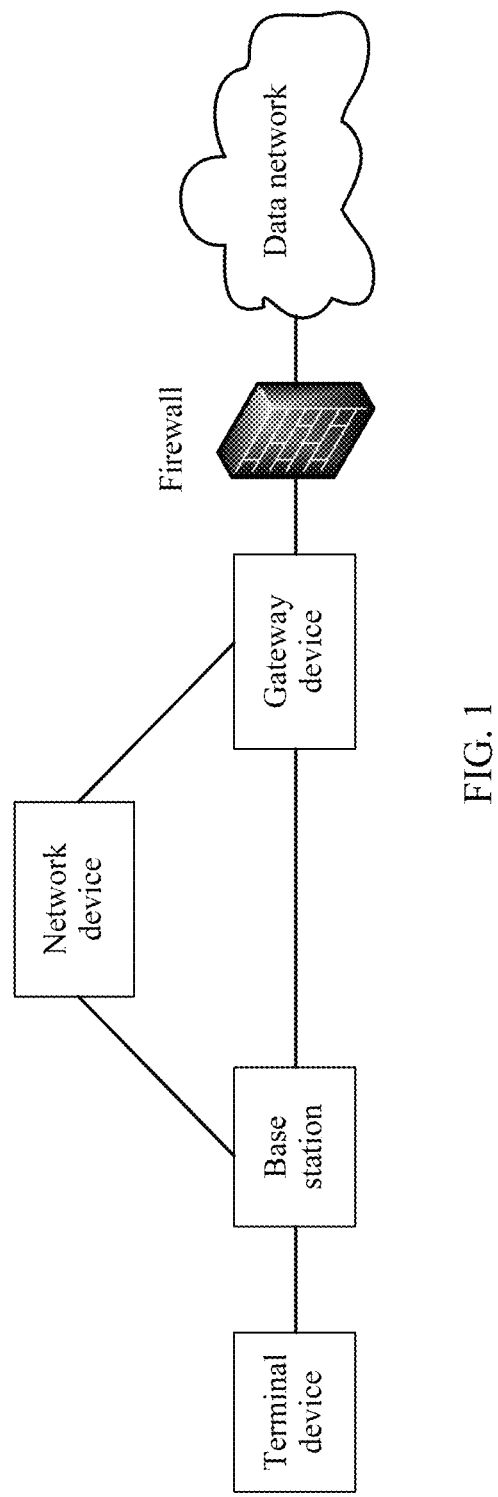
FIG. 1 is an architectural diagram of a mobile communications network system according to an embodiment of this application.

FIG. 1 is a possible logical architectural diagram of a mobile communications network system according to an embodiment of this application. It should be understood that the embodiments of this application are not limited to the system shown in FIG. 1. As shown in FIG. 1, the mobile communications network system provided in this embodiment of this application includes a terminal device, a base station, a network device, a gateway device, and a data network, and may further include a firewall. An operation of filtering a downlink data packet is performed by the gateway device, the firewall, or another network device that can perform a filtering function. This is not specifically limited in this application.

The network device may be a control plane (CP) function network element, a core control function (CCF), a serving GPRS support node (SGSN), or a mobility management entity (MME). The network device is responsible for device registration, security authentication, mobility management, location management, and the like for user equipment. The control plane function network element or the core control function may include functions such as an authentication and mobility management function (AMF) and a session management function (SMF). The AMF is responsible for mobility management, NAS message routing, SMF selection, and the like for the UE. The SMF is responsible for session management such as session creation, modification, and deletion, user plane function (UPF) selection, and UE IP address allocation.

The gateway device may be a user plane (UPF) network element, a packet data network (PDN) gateway (GW), a serving gateway (S-GW), or a gateway GPRS support node (GGSN). The gateway device is configured to forward a data packet between the user equipment and an external data network.

The base station may also be referred to as an access node (AN), and provides a wireless access service for the terminal device. The access node may be specifically a base transceiver station (BTS) in a global system for mobile communications (GSM for short) or a code division multiple access (CDMA) system, may be a NodeB (NodeB) in a wideband code division multiple access (WCDMA) system, may be an evolved NodeB (eNB or eNodeB) in an LTE system, or may be a base station device, a small cell device, a wireless access node (WiFi AP), a worldwide interoperability for microwave access base station (English: Worldwide Interoperability for Microwave Access Base Station, WiMAX BS for short), or the like in a future 5G network. This is not limited in this application.

The terminal device may also be referred to as an access terminal, user equipment (UE), a subscriber unit, a subscriber station, a mobile station, a mobile console, a remote station, a remote terminal, a mobile device, a user terminal, a wireless communications device, a user agent, a user apparatus, or the like. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, an Internet of Things terminal device such as a fire detection sensor, a smart water meter/electricity meter, or a factory monitoring device.

In addition, the system architecture may include the data network (DN) used to provide a data transmission service for a user. The data network may be a PDN network such as the Internet (Internet) or an IP multimedia service (IMS).

It should be noted that "a plurality of" means two or more in this application. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, it should be understood that although terms "first", "second", and the like may be used in the embodiments of this application to describe various messages. However, the messages are not limited by the terms. These terms are merely used to distinguish between the messages.

In addition, a service flow policy in the embodiments of this application may include a data packet filtering rule. A preconfigured operation is performed on a data packet that meets the data packet filtering rule. The service flow policy may alternatively include a plurality of data packet filtering rules and operation information corresponding to each data packet filtering rule. An operation corresponding to a specific data packet filtering rule is performed on a data packet that meets the specific data packet filtering rule. The data packet filtering rule may include packet header information of a data packet such as a source Internet Protocol (IP for short) address, a destination IP address, a protocol type, a source port, and a destination port. The preconfigured operation or the operation information included in the service flow policy may be a block (block)/screen (screen)/pass (pass) operation, or the like.

This application provides a service flow control method and apparatus, to resolve an existing problem of low security. The method and the apparatus are based on a same inventive concept. Because a problem-resolving principle of the method is similar to that of the apparatus, mutual reference may be made to apparatus implementation and method implementation. No repeated description is provided.

The embodiments of this application are described below in detail with reference to the accompanying drawings.

In a possible application scenario, a terminal device generates a service flow policy, and sends the service flow policy to a routing device configured to perform data packet filtering. In another possible application scenario, a service flow policy is configured on an operator application platform, and the operator application platform sends the service flow policy to a routing device configured to perform data packet filtering.

The following describes the scenario in which a terminal device generates a service flow policy, and sends the service flow policy to a routing device configured to perform data packet filtering.

Figure 2:
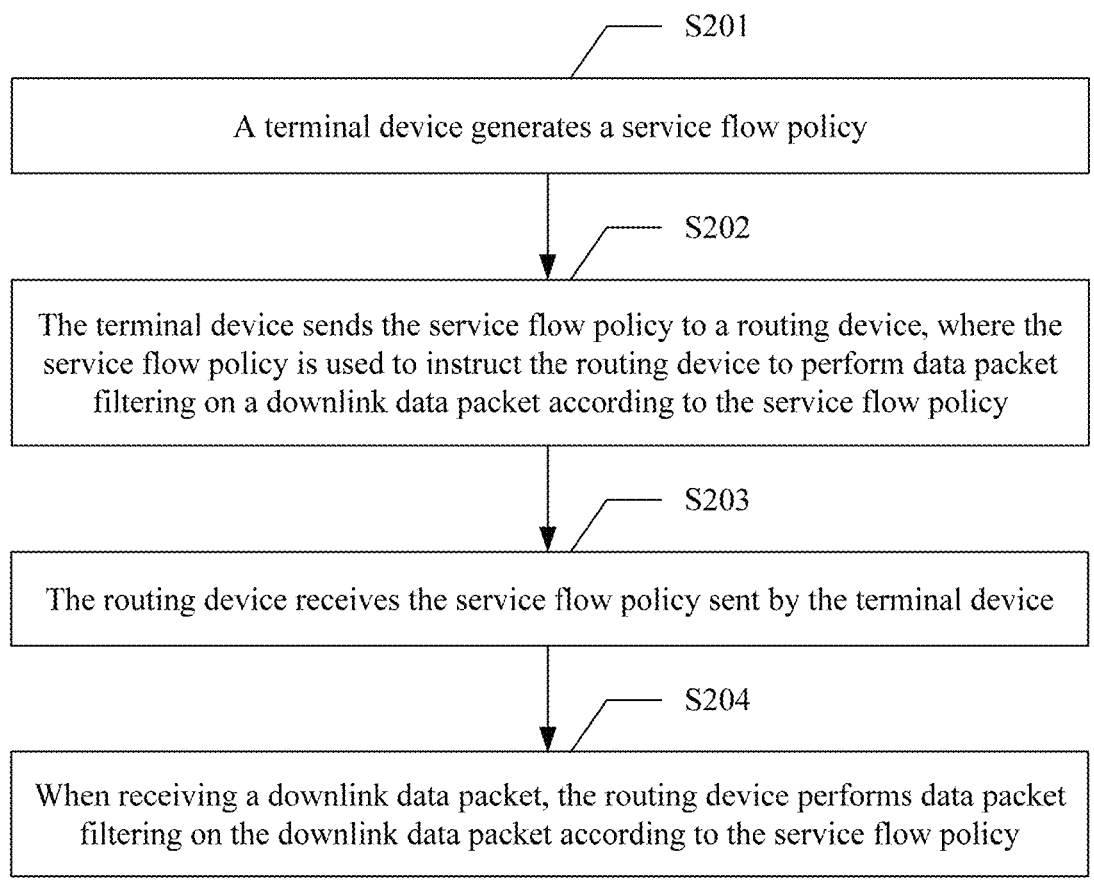
FIG. 2 is a flowchart of a service flow control method according to an embodiment of this application.

FIG. 2 is a service flow control method according to an embodiment of this application. A procedure of the method is as follows:

Operation S201. A terminal device generates a service flow policy.

Operation S202. The terminal device sends the service flow policy to the routing device, where the service flow policy is used to instruct the routing device to perform data packet filtering on a downlink data packet according to the service flow policy.

Operation S203. The routing device receives the service flow policy sent by the terminal device.

Operation S204. When receiving a downlink data packet, the routing device performs data packet filtering on the downlink data packet according to the service flow policy.

In the foregoing application scenario, in a possible implementation, the service flow policy is sent by the terminal device and is forwarded by a network device. Specifically, in FIG. 3, description is provided by using an example in which the routing device is a gateway device or a firewall.

Operation S301. The terminal device is attached to the network device, and establishes a data connection to a gateway device. A process in which the terminal device is attached to the network device may also be considered as a process in which the terminal device registers with a network side. For a detailed attachment process, refer to a solution provided in the prior art. Details are not described in this embodiment of this application.

Operation S302. The terminal device generates a service flow policy, and sends the generated service flow policy to the network device.

The service flow policy may include a plurality of data packet filtering rules and operation information corresponding to each data packet filtering rule. Each data packet filtering rule includes information such as a source IP address, a destination IP address, a protocol type, a source port, and a destination port. The operation information corresponding to each data packet filtering rule is a corresponding operation performed on a data packet that matches the data packet filtering rule. The operation may be a block (block)/screen (screen)/pass (pass) operation, or the like.

In one embodiment, the terminal device may generate the service flow policy in the following manners:

Implementation 1:

A service flow policy is preconfigured on the terminal device, and the terminal device generates the service flow policy based on the preconfigured service flow policy.

Implementation 2:

The terminal device identifies a downlink data packet that poses a security threat, and generates the service flow policy based on the identified downlink data packet. Specifically, after receiving a downlink data packet that may pose a security threat, the terminal device obtains information such as a source IP address, a destination IP address, a protocol type, a source port, and a destination port in the downlink data packet, to generate the service flow policy.

A rule for identifying the downlink data packet that poses a security threat may be preconfigured on the terminal device. For example, if the terminal device determines, after receiving a downlink data packet, that there is no port for listening to the downlink data packet, the terminal device identifies that the downlink data packet poses a security threat.

Implementation 3:

The terminal device identifies a downlink data packet that poses a security threat, and generates the service flow policy based on a downlink data packet that poses a security threat and that is confirmed by a user.

In one embodiment, after identifying that a downlink data packet that may pose a security threat is received, the terminal device provides an interface for the user to confirm, and then generates the service flow policy based on the data packet that poses a security threat and that is confirmed by the user.

Implementation 4:

The terminal device obtains the service flow policy by identifying information entered by a user.

In one embodiment, a user holding the terminal device may enter the service flow policy on an interface provided by the terminal device.

In the foregoing implementation 2 and implementation 3, after identifying the downlink data packet that poses a security threat, and generating the service flow policy based on the downlink data packet, the terminal device may not immediately notify the routing device of the service flow policy, but store the service flow policy, and then notify the routing device after a specific period. For example, one or more stored service flow policies are notified to the routing device after one minute. Alternatively, after identifying the downlink data packet that poses a security threat each time, the terminal device may generate the service flow policy based on the data packet that poses a security threat, and notify the routing device of the service flow policy in real time.

Operation S303. After the network device receives the service flow policy sent by the terminal device, the network device sends the service flow policy to the gateway device/firewall.

Operation S304. The gateway device/firewall receives a downlink data packet from a data network.

Operation S305. The gateway device/firewall determines a data packet filtering rule that matches the downlink data packet, and performs an operation corresponding to the matched data packet filtering rule on the downlink data. For example, the downlink data packet is blocked, or the downlink data packet is sent to the terminal device.

In one embodiment, in operation S306, when determining that the operation performed on the downlink data packet is a pass operation, the gateway device/firewall sends the downlink data packet to the terminal device.

In the foregoing solution, according to the service flow policy sent by the terminal device, in other words, based on a requirement of the terminal device, the gateway device or the firewall blocks a data packet that poses a security threat, and allows a secure data packet to pass, to avoid causing, to the terminal device, a security risk such as a property loss or privacy information leakage.

Figure 4:
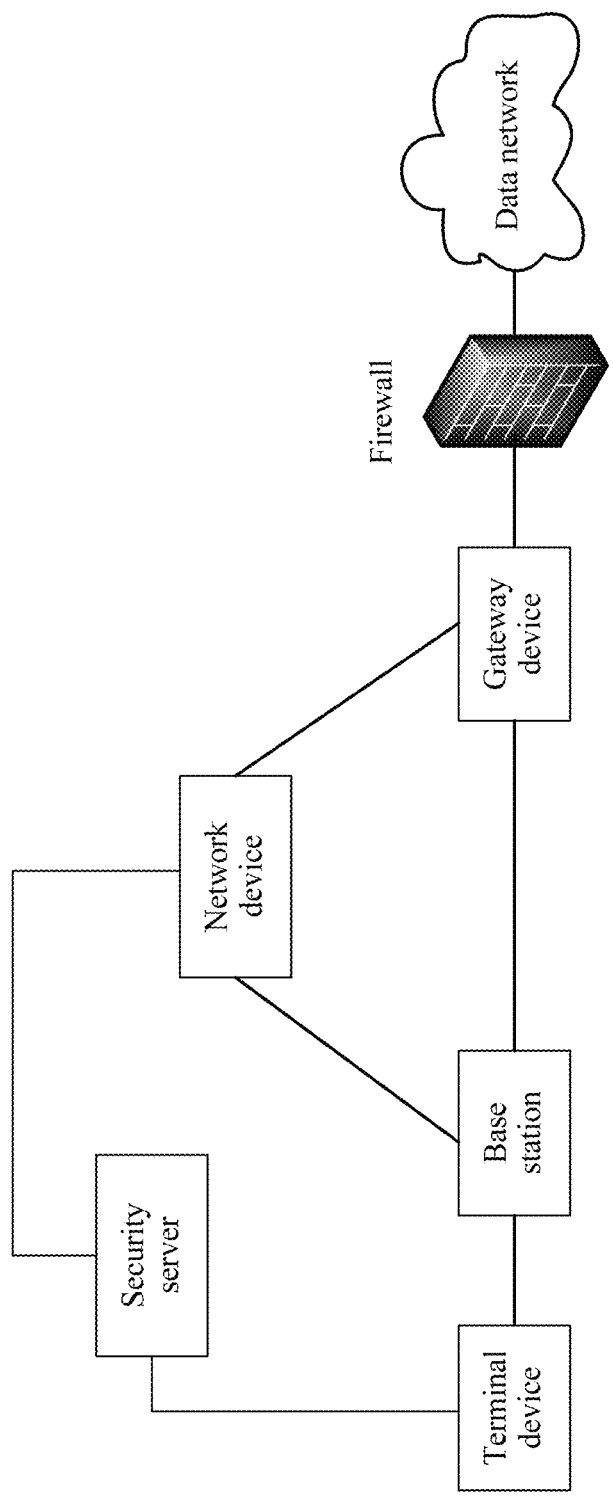
FIG. 4 is an architectural diagram of another mobile communications network system according to an embodiment of this application.

In the foregoing application scenario, in another possible implementation, a new function entity, namely, a security server responsible for managing the service flow policy of the terminal device, may be configured in a mobile communications network system, so that the service flow policy sent by the terminal device to a gateway device or a firewall is forwarded by the security server. FIG. 4 is a logical architectural diagram of a mobile communications network system to which a security server is added.

Figure 5:
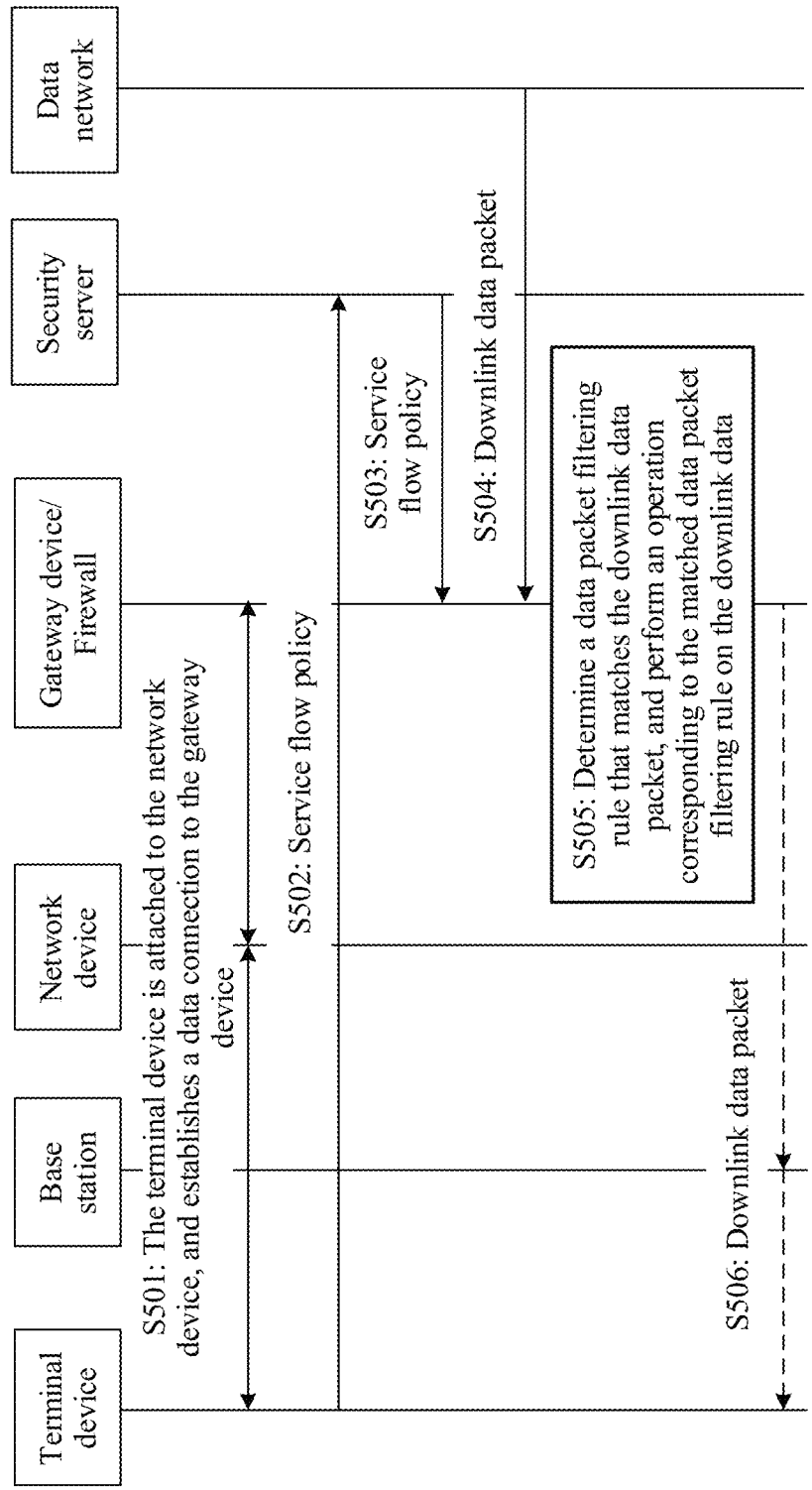
FIG. 5 is a schematic flowchart of another service flow control method according to an embodiment of this application.

In one embodiment, a procedure of a service flow control method is shown in FIG. 5.

Operation S501. The terminal device is attached to a network device, and establishes a data connection to a gateway device.

In operation S501, in a process in which the terminal device registers with the network device, the network device notifies the terminal device of a communication address (for example, an IP address) of the security server. The communication address of the security server may be preconfigured on the network device. Alternatively, a communication address of the security server may be obtained by using an operation and maintenance (O&M for short) center, or may be obtained from another network.

Operation S502. The terminal device generates a service flow policy, and sends the generated service flow policy to the security server.

The service flow policy may include a plurality of data packet filtering rules and operation information corresponding to each data packet filtering rule. Each data packet filtering rule includes information such as a source IP address, a destination IP address, a protocol type, a source port, and a destination port. The operation information corresponding to each data packet filtering rule is a corresponding operation performed on a data packet that matches the data packet filtering rule. The operation may be a block (block)/screen (screen)/pass (pass) operation, or the like.

Figure 3:
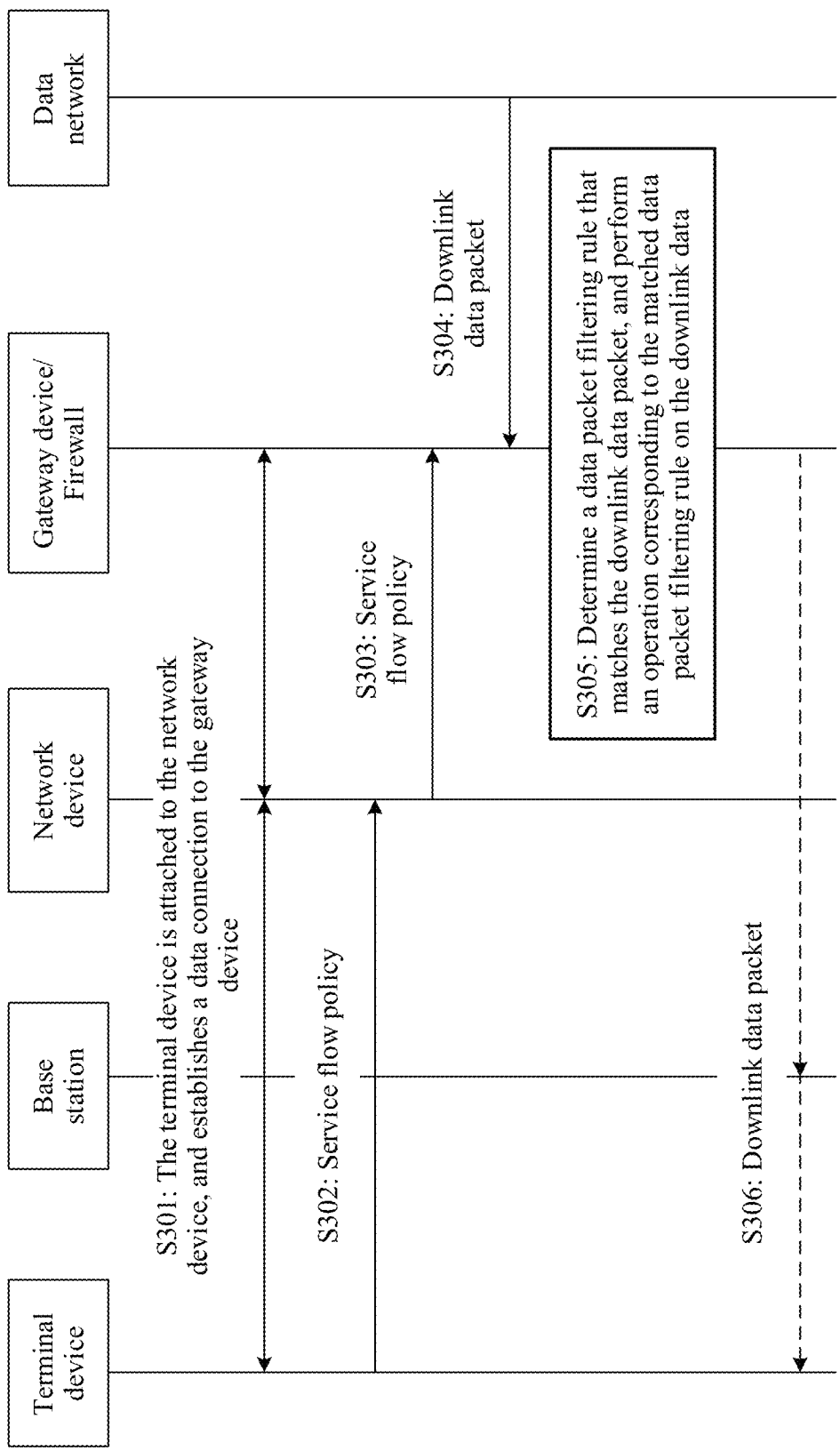
FIG. 3 is a schematic flowchart of a service flow control method according to an embodiment of this application.

Specifically, for a manner in which the terminal device generates the service flow policy, refer to the manner described in the embodiment corresponding to FIG. 3. Details are not described again in this embodiment of this application.

Operation S503. After receiving the service flow policy sent by the terminal device, the security server sends service flow policy information to the gateway device/firewall.

Operation S504. The gateway device/firewall receives a downlink data packet from a data network.

Operation S505. The gateway device/firewall determines a data packet filtering rule that matches the downlink data packet, and performs an operation corresponding to the matched data packet filtering rule on the downlink data. For example, the downlink data packet is blocked, or the downlink data packet is sent to the terminal device.

In one embodiment, in S506, when determining that the operation performed on the downlink data packet is a pass operation, the gateway device/firewall sends the downlink data packet to the terminal device.

In the foregoing solution, the gateway device or the firewall receives, by using the security server, the service flow policy sent by the terminal device, so that according to the service flow policy sent by the terminal device, in other words, based on a requirement of the terminal device, the gateway device or the firewall blocks a data packet that poses a security threat, and allows a secure data packet to pass. Because the security server is of relatively high security, security of the service flow policy is ensured, to avoid causing, to the terminal device, a security risk such as a property loss or privacy information leakage.

The following describes in detail the scenario in which a service flow policy is configured on an operator application platform. The operator application platform is a device in an application platform management network, and is of relatively high security.

Figure 6:
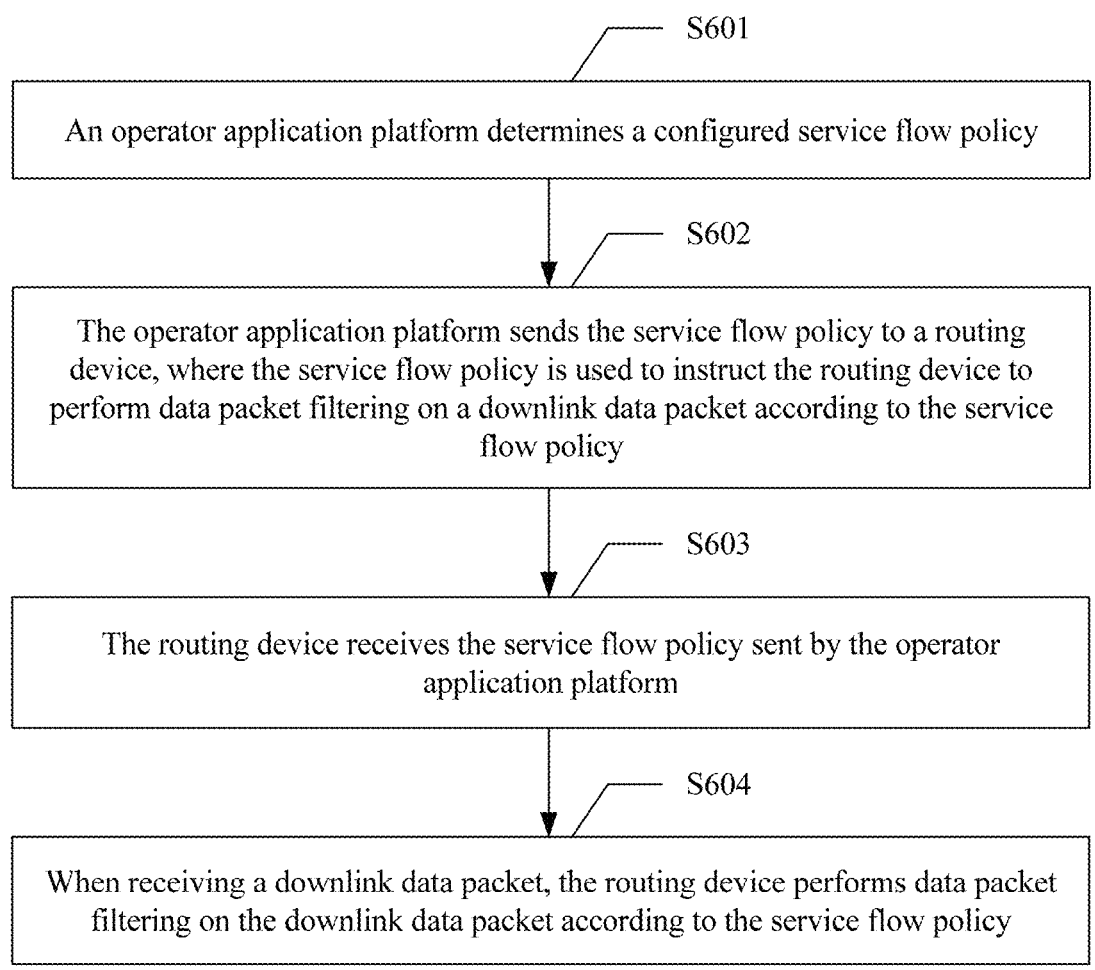
FIG. 6 is a flowchart of another service flow control method according to an embodiment of this application.

FIG. 6 is a flowchart of a service flow control method according to an embodiment of this application. The method includes the following operations:

Operation S601. An operator application platform determines a service flow policy.

Operation S602. The operator application platform sends the service flow policy to a routing device, where the service flow policy is used to instruct the routing device to perform data packet filtering on a downlink data packet according to the service flow policy.

Operation S603. The routing device receives the service flow policy sent by the operator application platform.

Operation S604. When receiving a downlink data packet, the routing device performs data packet filtering on the downlink data packet according to the service flow policy.

In the foregoing application scenario, the operator application platform sends the service flow policy to the routing device by using a network device. In one embodiment, in FIG. 7, description is provided by using an example in which the routing device is a gateway device or a firewall.

Operation S701. The operator application platform sends a correspondence between a user attribute and a service flow policy to the network device.

The operator application platform is of relatively high security. An operator may configure the correspondence between the user attribute and the service flow policy on the operator application platform. The user attribute may be a user identifier or a user type. The user identifier may be an international mobile subscriber identity (IMSI for short), an international mobile equipment identity (IMEI for short), a mobile station identity (MSISDN for short), or the like. The user type may be a mobile broadband (MBB for short) user, an Internet of Vehicles user, an Internet of Things user, or the like. A correspondence between a specific type of users and a service flow policy may be configured on the operator application platform. For example, only the Internet of Vehicles user is allowed to use some applications related to an Internet of Vehicles.

Operation S702. A terminal device is attached to the network device, and establishes a data connection to a gateway device. In a process in which the terminal device is attached to the network device, in other words, in a process in which the terminal device registers with the network device, the network device obtains a user attribute of the terminal device.

Operation S703. After obtaining a user attribute of the terminal device, the network device determines a service flow policy corresponding to the user attribute. Therefore, the network device obtains the service flow policy corresponding to the terminal device.

Operation S704. The network device sends the service flow policy to the gateway device/firewall.

Operation S705. The gateway device/firewall receives a downlink data packet from a data network.

Operation S706. The gateway device/firewall determines a data packet filtering rule that matches the downlink data packet, and performs an operation corresponding to the matched data packet filtering rule on the downlink data. For example, the downlink data packet is blocked, or the downlink data packet is sent to the terminal device.

In one embodiment, in operation S707, when determining that the operation performed on the downlink data packet is a pass operation, the gateway device/firewall sends the downlink data packet to the terminal device.

Figure 7:
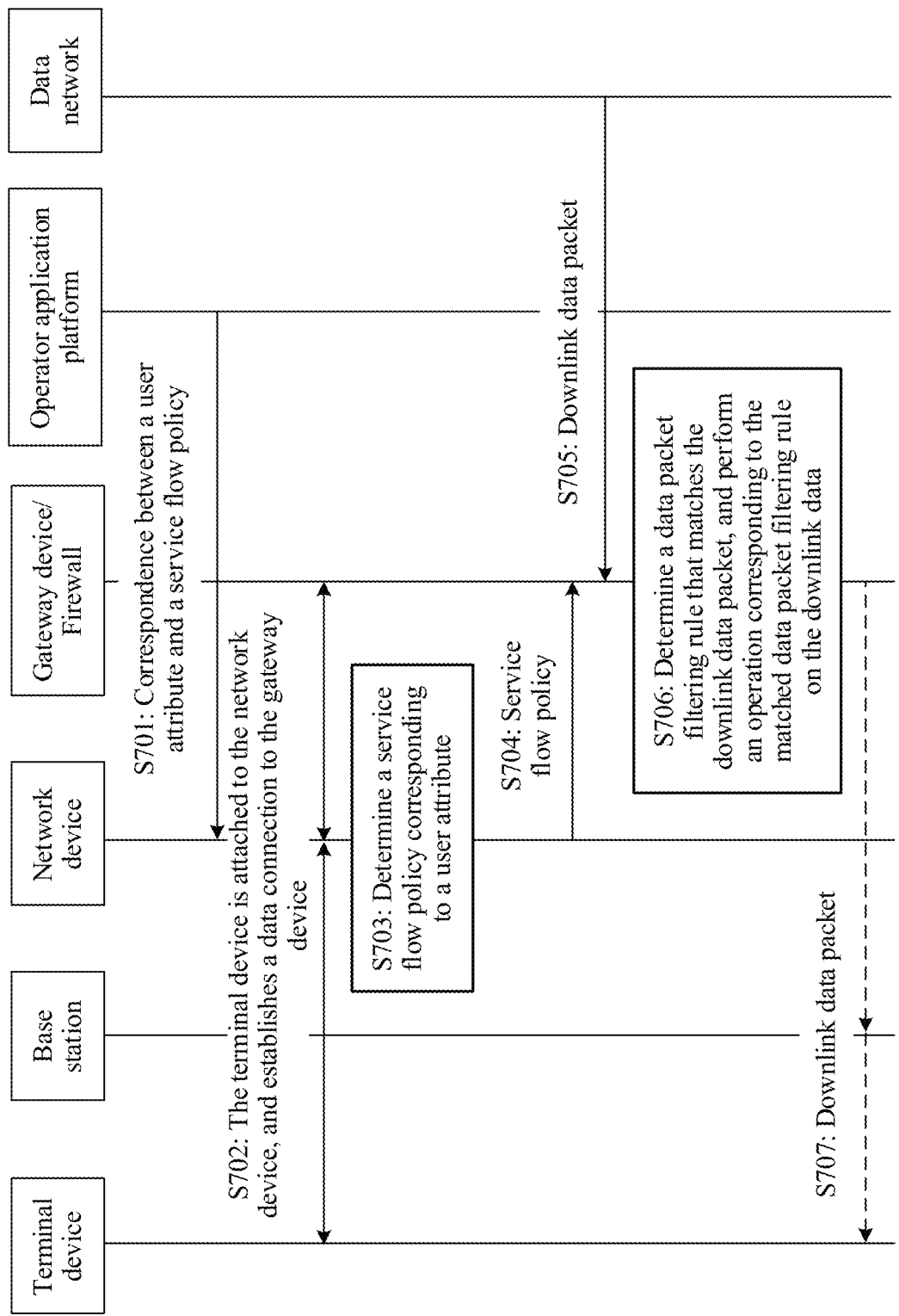
FIG. 7 is a flowchart of still another service flow control method according to an embodiment of this application.
Figure 8:
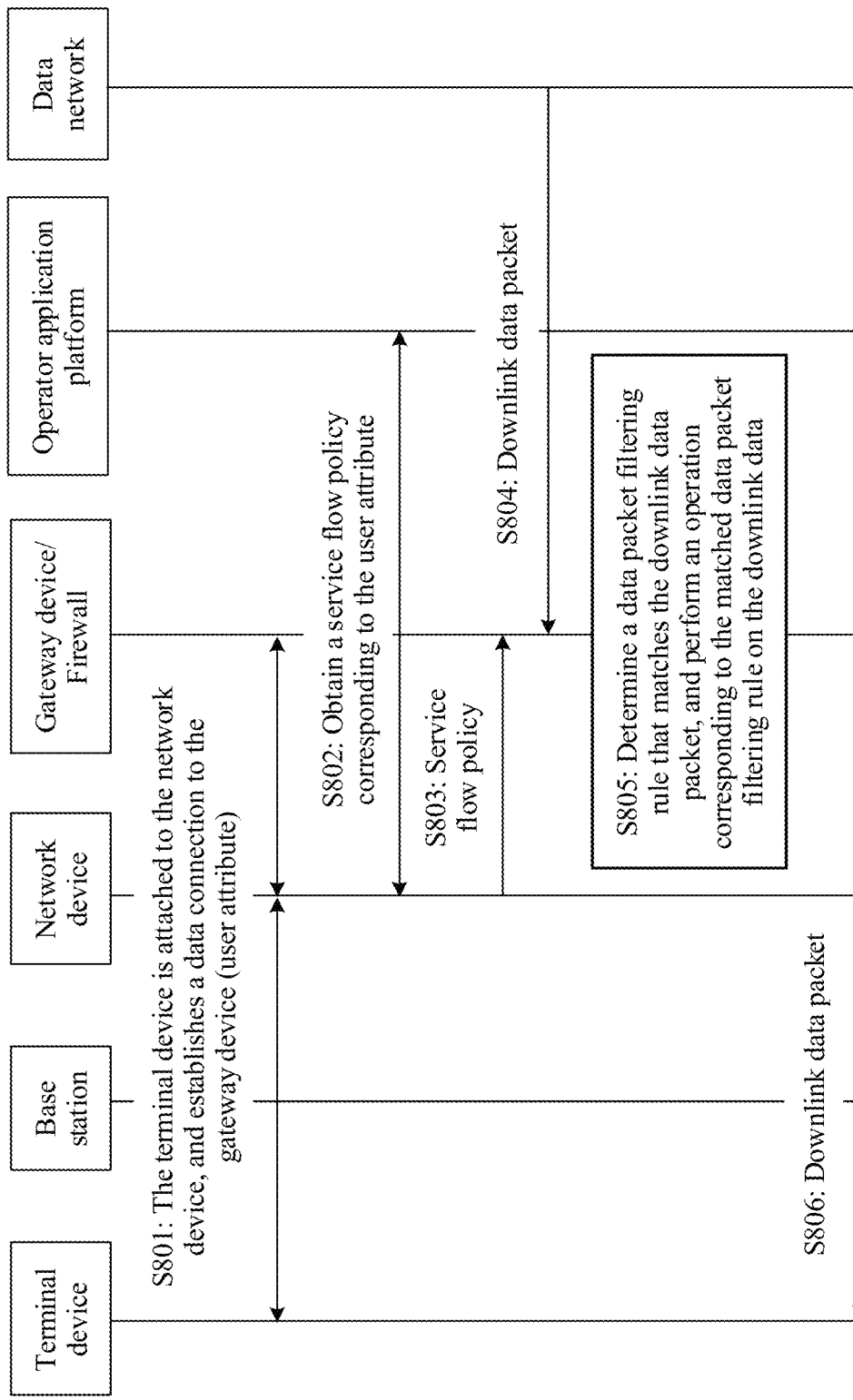
FIG. 8 is a flowchart of yet another service flow control method according to an embodiment of this application.

It should be noted that, in the embodiment corresponding to FIG. 7, the operator application platform pushes the correspondence between the user attribute and the service flow policy to the network device. In specific implementation, alternatively, after a terminal device is attached to the network device, the network device obtains a service flow policy corresponding to the terminal device from the application platform. For details, refer to FIG. 8.

Operation S801. The terminal device is attached to the network device, and establishes a data connection to a gateway device. In a process in which the terminal device is attached to the network device, in other words, in a process in which the terminal device registers with the network device, the network device obtains a user attribute of the terminal device.

Operation S802. After obtaining a user attribute of the terminal device, the network device obtains a service flow policy corresponding to the user attribute from the operator application platform.

A correspondence between a user attribute and a service flow policy is configured on the operator application platform.

Operation S803. The network device sends the service flow policy to a gateway device/firewall.

Operation S804. The gateway device/firewall receives a downlink data packet from a data network.

Operation S805. The gateway device/firewall determines a data packet filtering rule that matches the downlink data packet, and performs an operation corresponding to the matched data packet filtering rule on the downlink data. For example, the downlink data packet is blocked or the downlink data packet is sent to the terminal device.

In one embodiment, in operation S806, when determining that the operation performed on the downlink data packet is a pass operation, the gateway device/firewall sends the downlink data packet to the terminal device.

In the foregoing solution, different correspondences between user attributes and service flow policies are configured on the operator application platform, so that different service flow policies are used for different users. For example, a service flow policy is configured for some users with a special requirement. For example, for an Internet of Vehicles user, only a data packet related to an Internet of Vehicles can be allowed to pass, and is sent to a terminal device of the Internet of Vehicles user, and all other data packets are blocked, to ensure security of the user and avoid causing, to the user, a security risk such as property loss or privacy information leakage. In addition, the foregoing solution can support differentiated and flexible control based on a vertical industry application mode.

Figure 9:
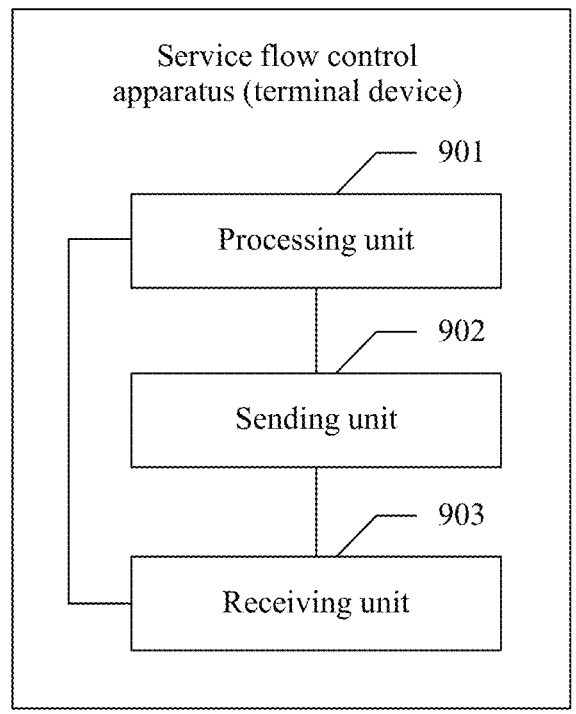
FIG. 9 is a schematic diagram of a service flow control apparatus applied to a terminal device according to an embodiment of this application.

Based on a same inventive concept as the method embodiment, an embodiment of this application provides a service flow control apparatus. The apparatus is applied to a terminal device. Referring to FIG. 9, the apparatus includes:

a processing unit 901, configured to generate a service flow policy; and a sending unit 902, configured to send the service flow policy generated by the processing unit 901 to a routing device, where the service flow policy is used to instruct the routing device to perform data packet filtering on a downlink data packet according to the service flow policy.

In one embodiment, the processing unit 901 is configured to:

generate the service flow policy based on service flow policy configuration information; or generate the service flow policy based on information that is entered by a user and that is about a data packet that poses a security threat; or identify a downlink data packet that poses a security threat, and generate the service flow policy based on the identified downlink data packet; or identify a downlink data packet that poses a security threat, and generate the service flow policy based on a downlink data packet that poses a security threat and that is confirmed by a user.

In one embodiment, the apparatus further includes:

a receiving unit 903, configured to receive the downlink data packet; and when identifying the downlink data packet that poses a security threat, the processing unit 901 is configured to:

if it is determined that there is no port for listening to the downlink data packet on the terminal device, identify that the downlink data packet poses a security threat.

In one embodiment, the sending unit 902 is configured to:

send the service flow policy to the routing device by using a network device; or send the service flow policy to the routing device by using a security server.

In one embodiment, the apparatus further includes:

a receiving unit 903, configured to receive, in a process in which the terminal device registers with the network device, a communication address of the security server that is sent by the network device; and when sending the service flow policy to the routing device by using the security server, the sending unit 902 is configured to:

send the service flow policy to the security server based on the communication address of the security server.

In one embodiment, the service flow policy includes at least one data packet filtering rule and operation information corresponding to each data packet filtering rule.

In one embodiment, the routing device is a gateway device or a firewall.

In this embodiment of this application, unit division is an example, and is merely logical function division. In actual implementation, there may be another division manner. In addition, function units in this embodiment of this application may be integrated into one processor, or may exist alone physically, or two or more units may be integrated into one unit. The integrated unit may be implemented in a form of hardware, or may be implemented in a form of a software function unit.

Figure 10:
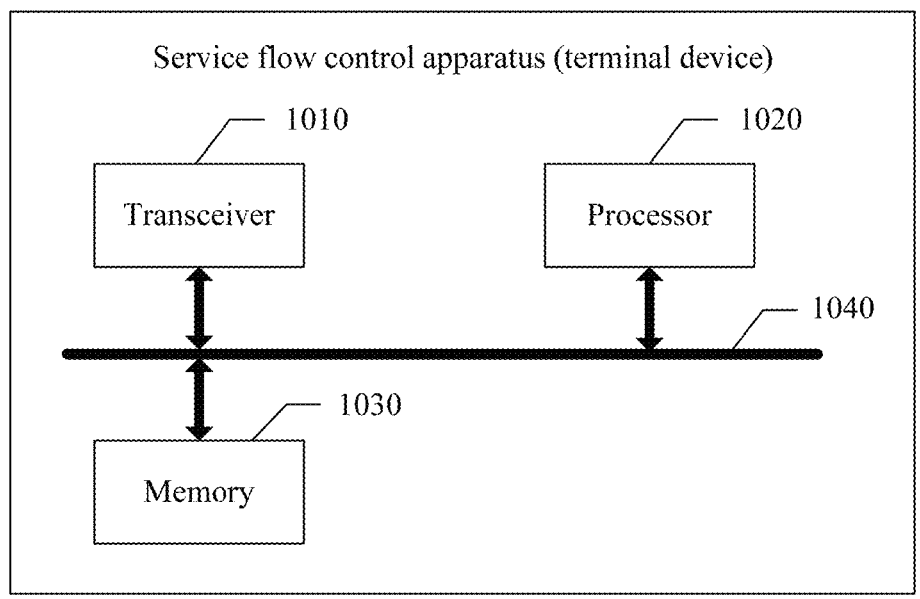
FIG. 10 is a schematic diagram of another service flow control apparatus applied to a terminal device according to an embodiment of this application.

As shown in FIG. 10, a service flow control apparatus applied to a terminal device may include a transceiver 1010, a processor 1020, and a memory 1030. Hardware of an entity corresponding to the units shown in FIG. 9 may be the processor 1020. The processor 1020 receives and sends data by using the transceiver 1010, and is configured to implement the method performed by the terminal device in FIG. 2, FIG. 3, and FIG. 5 to FIG. 8. In an implementation process, the operations in the processing procedure may be completed by using an integrated logic circuit of hardware in the processor 1020 or an instruction in a form of software. The processor 1020 may be a general purpose processor, a digital signal processor, an application-specific integrated circuit, a field programmable gate array or another programmable logic device, a discrete gate or a transistor logic device, or a discrete hardware component, and may implement or execute the methods, operations, and logical block diagrams disclosed in the embodiments of this application. The general purpose processor may be a microprocessor, any conventional processor, or the like. The operations of the method disclosed with reference to the embodiments of this application may be directly performed by a hardware processor, or may be performed by using a combination of the hardware in the processor and a software unit. Program code used by the processor 1020 to implement the foregoing method may be stored in the memory 1030. The memory 1030 may be a nonvolatile memory such as a hard disk (HDD for short) or a solid state drive (SSD for short), or may be a volatile memory (volatile memory) such as a random access memory (RAM for short). The memory 1030 is any other medium that can be configured to carry or store expected program code in a form of an instruction or a data structure and that can be accessed by a computer, but is not limited thereto.

In this embodiment of this application, a specific connection medium between the transceiver 1010, the processor 1020, and the memory 1030 is not limited. In this embodiment of this application, the memory 1030, the processor 1020, and the transceiver 1010 are connected by using a bus 1040 in FIG. 10. The bus is represented by using a bold line in FIG. 10. The foregoing is merely an example for description. A connection manner of other components is not limited thereto. The bus may be classified into an address bus, a data bus, a control bus, and the like. For ease of representation, only one bold line is used to represent the bus in FIG. 10, but this does not mean that there is only one bus or only one type of bus.

Figure 11:
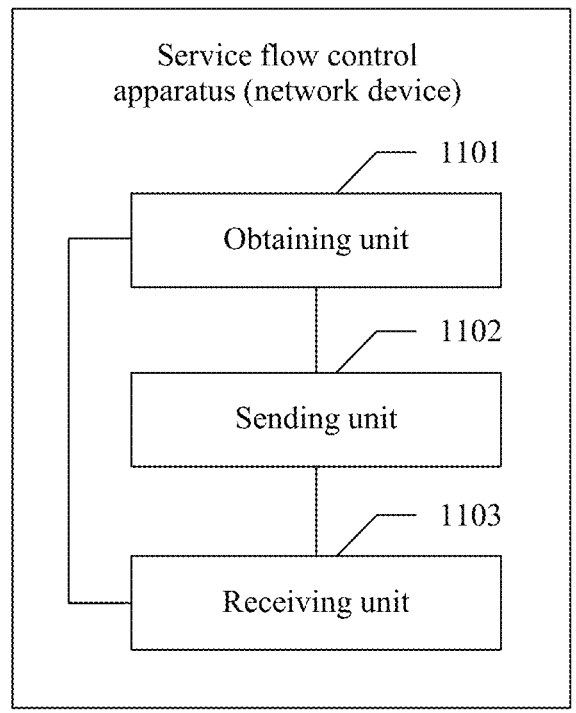
FIG. 11 is a schematic diagram of a service flow control apparatus applied to a network device according to an embodiment of this application.

An embodiment of this application provides a service flow control apparatus. The apparatus is applied to a network device, and the network device may be the network device shown in FIG. 1 or FIG. 4. Referring to FIG. 11, the apparatus includes:

an obtaining unit 1101, configured to obtain a service flow policy; and a sending unit 1102, configured to send the service flow policy to a routing device, where the service flow policy is used to instruct the routing device to perform data packet filtering on a downlink data packet according to the service flow policy.

In one embodiment, the service flow policy includes at least one data packet filtering rule and operation information corresponding to each data packet filtering rule.

In one embodiment, the apparatus further includes:

a receiving unit 1103, configured to receive the service flow policy sent by a terminal device.

In one embodiment, the obtaining unit 1101 is configured to:

obtain the service flow policy from an operator application platform.

In one embodiment, the receiving unit 1103 is further configured to: before the obtaining unit 1101 obtains the service flow policy, receive a correspondence that is between a user attribute and a service flow policy and that is sent by the operator application platform; and the obtaining unit 1101 is configured to: obtain a user attribute of a terminal device in a process in which the terminal device registers with the network device, and determine a service flow policy corresponding to the user attribute of the terminal device.

In one embodiment, the obtaining unit 1101 is further configured to obtain, in a process in which a terminal device registers with the network device, a user attribute of the terminal device before obtaining the service flow policy; and the obtaining unit 1101 is configured to obtain a service flow policy corresponding to the user attribute from the operator application platform when obtaining the service flow policy.

In one embodiment, the sending unit 1102 is further configured to:

send a communication address of a security server to a terminal device in a process in which the terminal device registers with the network device, so that the terminal device sends the service flow policy to the routing device by using the security server based on the communication address.

In one embodiment, the routing device is a gateway device or a firewall.

In this embodiment of this application, unit is an example, and is merely logical function division. In actual implementation, there may be another division manner. In addition, function units in this embodiment of this application may be integrated into one processor, or may exist alone physically, or two or more units may be integrated into one unit. The integrated unit may be implemented in a form of hardware, or may be implemented in a form of a software function unit.

Figure 12:
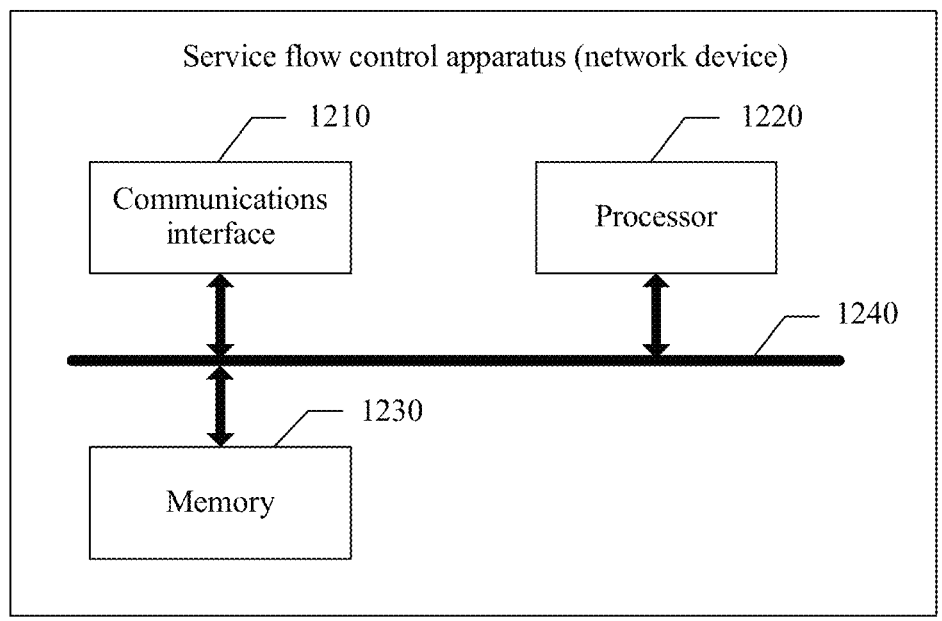
FIG. 12 is a schematic diagram of another service flow control apparatus applied to a network device according to an embodiment of this application.

As shown in FIG. 12, a service flow control apparatus applied to a network device may include a communications interface 1210, a processor 1220, and a memory 1230. Hardware of an entity corresponding to the units shown in FIG. 11 may be the processor 1220. The processor 1220 receives and sends data through the communications interface 1210, and is configured to implement the method performed by the network device in FIG. 2, FIG. 3, and FIG. 5 to FIG. 8. In an implementation process, the operations in the processing procedure may be completed by using an integrated logic circuit of hardware in the processor 1220 or an instruction in a form of software. The processor 1220 may be a general purpose processor, a digital signal processor, an application-specific integrated circuit, a field programmable gate array or another programmable logic device, a discrete gate or a transistor logic device, or a discrete hardware component, and may implement or execute the methods, operations, and logical block diagrams disclosed in the embodiments of this application. The general purpose processor may be a microprocessor, any conventional processor, or the like. The operations of the method disclosed with reference to the embodiments of this application may be directly performed by a hardware processor, or may be performed by using a combination of the hardware in the processor and a software unit. Program code used by the processor 1220 to implement the foregoing method may be stored in the memory 1230. The memory 1230 may be a nonvolatile memory such as an HDD or an SSD, or may be a volatile memory such as a RAM. The memory 1230 is any other medium that can be configured to carry or store expected program code in a form of an instruction or a data structure and that can be accessed by a computer, but is not limited thereto.

In this embodiment of this application, a specific connection medium between the communications interface 1210, the processor 1220, and the memory 1230 is not limited. In this embodiment of this application, the memory 1230, the processor 1220, and the communications interface 1210 are connected by using a bus 1240 in FIG. 12. The bus is represented by using a bold line in FIG. 12. The foregoing is merely an example for description. A connection manner of other components is not limited thereto. The bus may be classified into an address bus, a data bus, a control bus, and the like. For ease of representation, only one bold line is used to represent the bus in FIG. 12, but this does not mean that there is only one bus or only one type of bus.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer usable storage media (including but not limited to a disk memory, a CD-ROM, and an optical memory) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a dedicated computer, an embedded processor, or a processor of any other programmable data processing device to generate a machine, so that the instructions executed by the computer or the processor of any other programmable data processing device generate an apparatus for implementing a specific function in one or more processes in the flowcharts and/or in one or more blocks in the block diagrams.

These computer program instructions may be alternatively stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be alternatively loaded onto a computer or another programmable data processing device, so that a series of operations and operations are performed on the computer or the another programmable device, to generate computer-implemented processing. Therefore, the instructions executed on the computer or the another programmable device provide operations for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A service flow control method, performed by a terminal device, comprising:
   generating a service flow policy, comprising:
      identifying a downlink data packet that poses a security threat including: receiving the downlink data packet, and identifying that the downlink data packet poses a security threat in response to it being determined that there is no port for listening to the downlink data packet on the terminal device, and
      generating the service flow policy based on the identified downlink data packet; and
   sending the service flow policy to a routing device, wherein the service flow policy is used to instruct the routing device to perform data packet filtering on a downlink data packet according to the service flow policy.

2. The method according to claim 1, wherein the sending the service flow policy to a routing device comprises:
sending the service flow policy to the routing device by using a security server.

3. The method according to claim 2, further comprising:
receiving, in a process in which the terminal device registers with a network device, a communication address of the security server that is sent by the network device; and
the sending the service flow policy to the routing device by using a security server comprises:
sending the service flow policy to the security server based on the communication address of the security server.

4. The method according to claim 1, wherein the service flow policy comprises at least one data packet filtering rule and operation information corresponding to each data packet filtering rule.

5. A service flow control apparatus, comprising:
at least one processor; and
a memory coupled to the at least one processor to store instructions, which when executed by the at least one processor, cause the at least one processor to perform operations, the operations including:
generating a service flow policy, comprising:
identifying a downlink data packet that poses a security threat including: receiving the downlink data packet, and identifying that the downlink data packet poses a security threat in response to it being determined that there is no port for listening to the downlink data packet on a terminal device, and
generating the service flow policy based on the identified downlink data packet; and
send the service flow policy generated by the at least one processor to a routing device, wherein the service flow policy is used to instruct the routing device to perform data packet filtering on a downlink data packet according to the service flow policy.

6. The service flow control apparatus according to claim 5, wherein the instructions when further executed by the at least one processor, cause a mobility management network element to:
send the service flow policy to the routing device by using a security server.

7. The service flow control apparatus according to claim 6, wherein the instructions when further executed by the at least one processor, cause the mobility management network element to:
receive, in a process in which the terminal device registers with a network device, a communication address of the security server that is sent by the network device; and
send the service flow policy to the security server based on the communication address of the security server.

8. The apparatus according to claim 5, wherein the service flow policy comprises at least one data packet filtering rule and operation information corresponding to each data packet filtering rule.

9. A service flow control system, comprising
a terminal device
configured to:
generate a service flow policy,
identify a downlink data packet that poses a security threat including: receiving the downlink data packet, and identifying that the downlink data packet poses a security threat in response to it being determined that there is no port for listening to the downlink data packet on the terminal device, and
generate the service flow policy based on the identified downlink data packet; and
send the service flow policy to a routing device; and
wherein the routing device is configured to:
receive the service flow policy; and
perform data packet filtering on a downlink data packet according to the service flow policy.

10. The service flow control system according to claim 9, further comprising a network device,
wherein the network device is configured to: receive the service flow policy from the terminal device, and send the service flow policy to the routing device.

11. The service flow control system according to claim 9, further comprising a network device,
wherein the network device is configured to: send, in a process in which the terminal device registers with the network device, a communication address of a security server to the terminal device; and
wherein the terminal device is configured to: send the service flow policy to the routing device based on the communication address of the security server.

\* \* \* \* \*